US008456984B2

(12) United States Patent
Ranganathan et al.

(10) Patent No.: US 8,456,984 B2
(45) Date of Patent: Jun. 4, 2013

(54) VIRTUALIZED SHARED PROTECTION CAPACITY

(75) Inventors: Raghuraman Ranganathan, Bellaire, TX (US); Loudon Blair, Severna Park, MD (US); Michael Gazier, Ottawa (CA); Sashisekaran Thiagarajan, College Park, MD (US)

(73) Assignee: Ciena Corporation, Hanover, MD (US)

( * ) Notice: Subject to any disclaimer, the term of this patent is extended or adjusted under 35 U.S.C. 154(b) by 267 days.

(21) Appl. No.: 12/839,200

(22) Filed: Jul. 19, 2010

(65) Prior Publication Data
US 2012/0014284 A1    Jan. 19, 2012

(51) Int. Cl.
*G01R 31/08*    (2006.01)
(52) U.S. Cl.
USPC ............ 370/228; 370/216; 370/227; 370/254
(58) Field of Classification Search
USPC .................. 370/216, 227, 228, 254
See application file for complete search history.

(56) References Cited

U.S. PATENT DOCUMENTS

| | | | | |
|---|---|---|---|---|
| 6,662,308 | B1 * | 12/2003 | Baroni et al. | 714/4.1 |
| 7,680,934 | B2 | 3/2010 | Aubin et al. | |
| 2002/0186664 | A1 * | 12/2002 | Gibson et al. | 370/254 |
| 2003/0065811 | A1 * | 4/2003 | Lin et al. | 709/232 |
| 2005/0036499 | A1 | 2/2005 | Dutt et al. | |
| 2006/0203719 | A1 * | 9/2006 | Kim et al. | 370/227 |
| 2009/0252058 | A1 * | 10/2009 | Chen et al. | 370/254 |
| 2010/0061231 | A1 * | 3/2010 | Harmatos et al. | 370/228 |
| 2010/0135661 | A1 * | 6/2010 | Youn et al. | 398/68 |
| 2010/0290485 | A1 * | 11/2010 | Martini et al. | 370/477 |
| 2010/0309778 | A1 * | 12/2010 | Young | 370/219 |
| 2012/0106948 | A1 * | 5/2012 | Moynihan et al. | 398/10 |
| 2012/0294140 | A1 * | 11/2012 | Cheung et al. | 370/216 |

FOREIGN PATENT DOCUMENTS

WO    20080144927    12/2008

OTHER PUBLICATIONS

Raghu Ranganathan, Sashisekaran Thiagarajan, Loudon Blair, Joseph Berthold, Ciena Corporation; "Express Lightpaths and Shared Protection in Optical Mesh Networks"; Network Design 2.4.3 downloaded from IEEE Xplore on Sep. 17, 2009.

Lei Guo et al; "Survivable routing algorithm with mixed shared protection in fault-tolerant GMPLS multi-layered optical networks"; European Transactions on Telecommunciations; Jun. 1, 2006; vol. 21, No. 4, pp. 312-326, Wiley & Sons, Chichester, GB; abstract, p. 313-314, figure 1.

(Continued)

*Primary Examiner* — Dang T. Ton
*Assistant Examiner* — Robert M Morlan
(74) *Attorney, Agent, or Firm* — Clements Bernard PLLC; Christopher L. Bernard; Lawrence A. Baratta, Jr.

(57) ABSTRACT

The present disclosure relates a network, a network element, a system, and a method providing an efficient allocation of protection capacity for network connections and/or services. These may be for services within a given Virtual Private Network (VPN) or Virtual Machine (VM) instance flow. Network ingress/egress ports are designed to be VM instance aware while transit ports may or may not be depending on network element capability or configuration. A centralized policy management and a distributed control plane are used to discover and allocate resources to and among the VPNs or VM instances. Algorithms for efficient allocation and release of protection capacity may be coordinated between the centralized policy management and the distributed control plane. Additional coupling of attributes such as latency may provide more sophisticated path selection algorithms including efficient sharing of protection capacity.

20 Claims, 5 Drawing Sheets

OTHER PUBLICATIONS

Veitch P A et al.; "Design and performance issues of protection virtual path networks" Broadband Communications. Global Infrastructure for the Information Age. Proceedings of the International IFIP-IEEE Conference on Broadband Communications, Apr. 23, 1996, pp. 537-548, XP010525750, CA; abstract, p. 539.

Kong J et al.; "ProtectIT: Trusted distributed services operating on sensitive data". Operating Systems Review (ACM)—Eurosys '08—Proceedings of the Eurosys 2008 Conference, vol. 42, No. 4, Mar. 31, 2008, pp. 137-147, XP002666304, Association for Computing Machinery USA DOI: 10.1145/1357010.1352608, abstract, fig. 1.

* cited by examiner

VIRTUALIZED SHARED PROTECTION CAPACITY

FIELD OF THE INVENTION

The present invention relates generally to communication networks. More particularly, the present invention relates a network, a network element, a system, and a method providing an efficient allocation of protection capacity for network connections and/or services through virtualized shared protection capacity.

BACKGROUND OF THE INVENTION

Conventional optical network protection models allow dedicated protection capacity such as 1+1 or shared protection capacity such as bi-directional line switched rings (BLSR), multiplex section-shared protection ring (MS-SPRING) and shared mesh restoration. Protection capacity when dedicated is allocated to a specific customer service instance. Sharing of protection capacity reduces network capacity relative to dedicated protection capacity. Protection capacity may also be designed for single or multiple simultaneous failures. It is further possible to separate the protection capacity resources from the working capacity resources to optimize cost as well as to take advantage of electrical layer restoration. For example, working capacity may utilize all-optical express paths sharing protection via shared meshed optical-electrical-optical paths such as described in Ranganathan et al., "Express lightpaths and shared protection in optical mesh networks," 28th European Conference on Optical Communication, 8-12 Sep. 2002. With the transition to packet based services, such as in a Carrier Ethernet Network, protection capacity may become isolated to individual Virtual Private Networks (VPNs). This may result in inefficient use of network resources.

BRIEF SUMMARY OF THE INVENTION

In an exemplary embodiment, a network element includes a plurality of ports interfacing to a plurality of other network elements; and a control element coupled to the plurality of ports, wherein the control element is configured to provide virtualized shared protection capacity across a plurality of instance flows over the plurality of ports. The port may be a physical port on the network element or a sub port within a physical port based on some classification of the instance flows or a group of physical ports behaving as a logical port from the perspective of the instance flows. Each of the plurality of ports may include one of an ingress port, an egress port, and a transit port, and wherein the ingress port and the egress port are configured to be instance aware of the virtualized shared protection capacity. The plurality of instance flows may include one of virtual private networks and virtual machines. The network element may include a signaling and routing protocol operating on the control element and configured to communicate with the plurality of other network elements to manage and maintain the plurality of instance flows; and a communication interface in the control element communicatively coupled to a management system; wherein the signaling and routing protocol and the management system are configured to discover and allocate resources associated with the plurality of instance flows. The network element may include algorithms operating with the signaling and routing protocol and on the management system and the control element for efficient allocation and release of the virtualized shared protection capacity. The network element may include a plurality of attributes associated with each of the plurality of instance flows for the virtualized shared protection capacity. At least one of the plurality of ports may include dedicated protection bandwidth in addition to the virtualized shared protection capacity. The plurality of instance flows may include one of virtual private networks and virtual machines; wherein a client device attaches to one of the plurality of ports, the client device including a service application configured to request service from a hyper virtualizer on the network element; wherein the hyper virtualizer is configured to manage and maintain an abstract view of a network associated with the network element, the abstract view including a virtual network; and wherein the hyper virtualizer is configured to provide virtualized protection over one of the virtual private networks and the virtual machines. The virtualized protection may include a separate resource allowing each of the virtual private networks and virtual machines to have working capacity only in a layer of interest including any of IP (Layer 3), Ethernet (Layer 2), SONET/SDH (Layer 1) and Wavelengths (Layer 0). The separate resource may include units of protection bandwidth made available at endpoints of each of the virtual private networks and virtual machines.

In another exemplary embodiment, a network includes a plurality of interconnected nodes; a signaling and routing protocol operating on the plurality of interconnected nodes and configured to communicate between the plurality of interconnected nodes to manage and maintain a plurality of instance flows across the plurality of interconnected nodes; and virtualized shared protection of the plurality of instance flows, wherein the plurality of instance flows may include one of virtual private networks and virtual machines. The virtualized protection may include a separate resource allowing each of the virtual private networks and virtual machines to have working capacity only in a layer of interest including any of layer 0, layer one, layer two, and layer three. The separate resource may include units of protection bandwidth made available at endpoints of each of the virtual private networks and virtual machines. Each of the plurality of interconnected nodes may include a plurality of ports; and a control element coupled to the plurality of ports, wherein the control element is configured to provide the virtualized shared protection capacity across a plurality of instance flows over the plurality of ports. Each of the plurality of ports may include one of an ingress port, an egress port, and a transit port, and wherein only the ingress port and the egress port are configured to be instance aware of the virtualized shared protection capacity. The network may include a management system communicatively coupled to the plurality of interconnected nodes; wherein the signaling and routing protocol and the management system are configured to discover and allocate resources associated with the plurality of instance flows. The network may include algorithms operating with the signaling and routing protocol and on the management system for efficient allocation and release of the virtualized shared protection capacity. The network may include a plurality of attributes associated with each of the plurality of instance flows for the virtualized shared protection capacity. A client device attaches to one of the plurality of interconnected nodes, the client device including a service application configured to request service from a hyper virtualizer associated with the one of the plurality of interconnected nodes; wherein the hyper virtualizer is configured to manage and maintain an abstract view of the network element, the abstract view including a virtual network; and wherein the hyper virtualizer is configured to provide virtualized protection over one of the virtual private networks and the virtual machines.

In yet another exemplary embodiment, a method includes, from a management platform, defining application and network policies; discovering a physical network; mapping the application and network policies to a hyper virtualizer; from a service application, requesting service from the hyper virtualizer; instantiating a virtual network on the physical network based on the request; and providing virtualized protection via the virtual network for the service.

BRIEF DESCRIPTION OF THE DRAWINGS

The present invention is illustrated and described herein with reference to the various drawings of exemplary embodiments, in which like reference numbers denote like method steps and/or system components, respectively, and in which.

DETAILED DESCRIPTION OF THE INVENTION

In various exemplary embodiments, the present invention relates a network, a network element, a system, and a method providing an efficient allocation of protection capacity for network connections and/or services. These may be for services within a given Virtual Private Network (VPN) or Virtual Machine (VM) instance flow. Alternatively, this may be across all VPNs or VM instance flows in the network. Network ingress/egress ports are designed to be VM instance aware while transit ports may or may not be depending on network element capability or configuration. A centralized policy management and a distributed control plane are used to discover and allocate resources to and among the VPNs or VM instances. Algorithms for efficient allocation and release of protection capacity may be coordinated between the centralized policy management and the embedded control plane protocols. Additional coupling of service attributes such as latency may provide more sophisticated path selection algorithms including efficient sharing of protection capacity. The benefit is, however, constrained by the topology of a network. The present invention does not prevent associating dedicated and shared protection capacity for any given VM instance flow between peer VMs. Virtualization is a key use case to apply this invention. VMs allow to efficiently scale and support on-demand use of computing resources. These VMs may be located in a geographically distributed topology with requirements for high availability connectivity across a wide area network. Improving the path availability with only dedicated protection capacity, for a given VM instance flow, might result in inefficient network designs.

Figure 1:
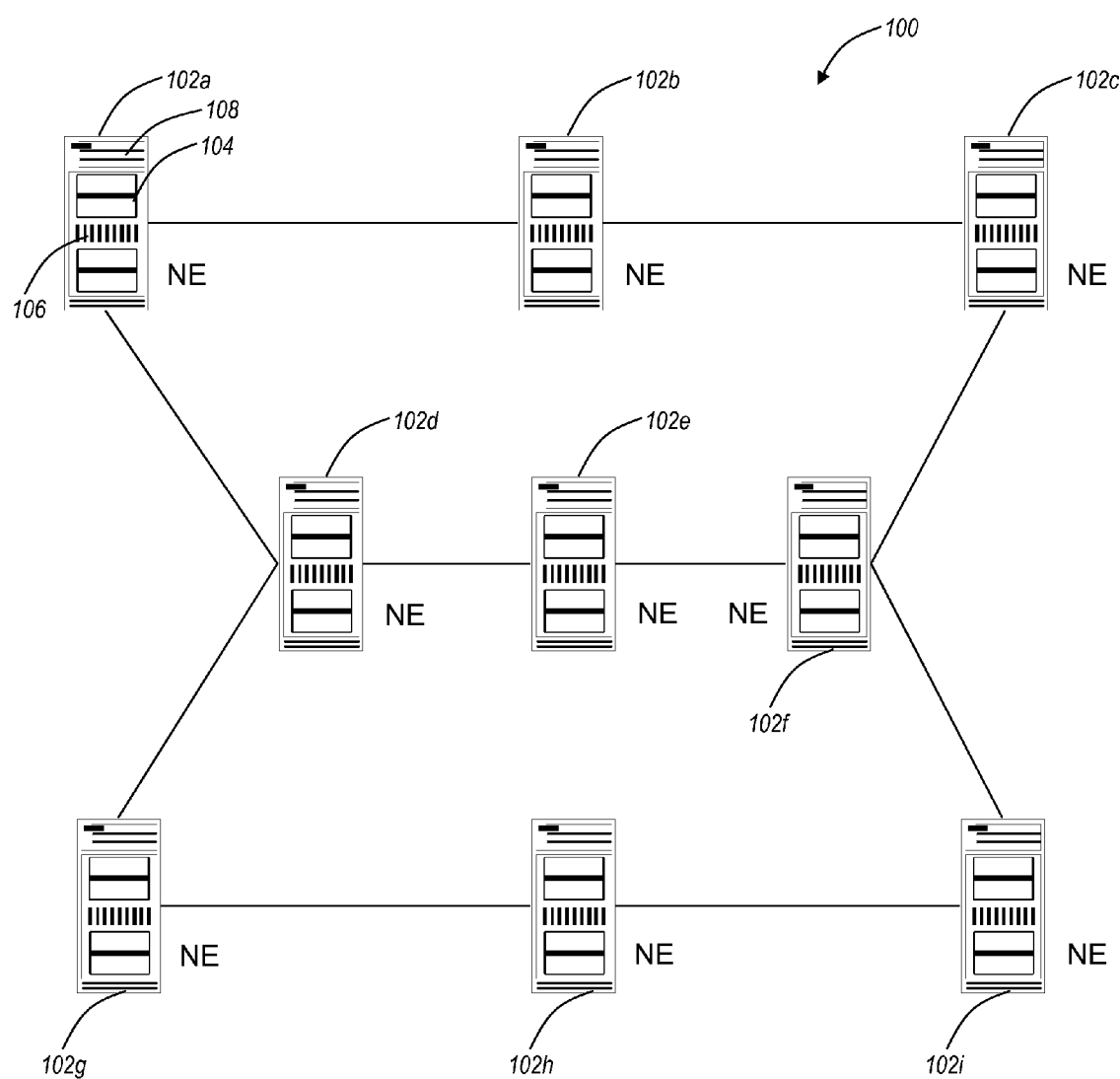
FIG. 1 is a diagram of a network with a plurality of network elements interconnected in a mesh configuration and configured to utilize virtualized shared capacity.

Referring to FIG. 1, in an exemplary embodiment, a network 100 is illustrated with a plurality of network elements 102a-102i interconnected in a mesh configuration. For example, the network 100 may include an optical network with each of the network elements 102a-102i including any of an optical switch, an optical cross-connect, a Synchronous Optical Network (SONET)/Synchronous Digital Hierarchy (SDH) multiplexer, a multi-service provisioning platform, a data switch/router, or the like. Each of the network elements 102a-102i may include a plurality of ports 104 that are switched through a switch matrix 106 and common equipment 108. For example, the plurality of ports 104 may be line modules, line cards, etc. with one or more optical ports (i.e. transceivers) that enable the network elements 102a-102i to connect over fiber optic links. The plurality of ports 104 may include dense wave division multiplexed (DWDM) transmission and may utilize a variety of protocols such as SONET, SDH, Optical Transport Network (OTN), Gigabit Ethernet, 10 Gigabit Ethernet, and the like. Further, the plurality of ports 104 may include subports based on classification of instance flow header information, for example, or logical ports as a binding of physical ports, etc.

The switch matrix 106 is configured to switch data between the various plurality of ports 104. This may include switching timeslots such as with SONET, SDH, OTN, etc. or data packets such as with Ethernet variants. The plurality of ports 104, the switch matrix 106, and the common equipment 108 may be interconnected via electrical interfaces such as a backplane, midplane, etc. The common equipment 108 includes one or more processors configured to control various operations, administration, maintenance, and provisioning (OAM&P) aspects associated with each network element 102. It should be understood that FIG. 1 is a simplified representation of the network 100 and the networks elements 102 for purposes of explanation. The topology and configuration of the network 100 may vary to suit the needs of the particular application, and FIG. 1 is not intended to limit the application or scope of the subject matter in any way. It should further be appreciated that FIG. 1 depicts the network elements 102a-102i in an oversimplified manner, and a practical embodiment may include additional/different components and suitably configured processing logic to support known or conventional operating features that are not described in detail herein.

The network 100 may include various different protection schemes to improve availability of connections across the network 100 from ingress to egress network elements 102a-102i. For example, assuming a connection from the network element 102a to the network element 102c, there may be a 1+1 scheme where there is a dedicated working route (e.g., 102a-102b-102c) and a dedicated protection route (e.g., 102a-102d-102e-102f-102c). Protection schemes may also include shared protection schemes such as BLSR rings (e.g., a ring between 102a-102b-102c-102d-102e-102f) or shared mesh restoration. Shared mesh restoration may utilize a signaling and routing protocol, such as Automatically Switched Optical Networks (ASON), Generalized Multi Protocol Label Switching (GMPLS), Optical Signaling and Routing Protocol (OSRP), and the like. Furthermore, protection bandwidth may be designed for single or multiple simultaneous failures in the network 100.

The network 100 may be partitioned into smaller protection or restoration domains to enable connection survivability against multiple simultaneous failures albeit with a constraint of no more than one failure per protection or restoration domain. Sharing of protection bandwidth reduces the overall network capacity requirements and is a useful benefit for a Service Provider in terms of capital expenses. Further, protection bandwidth may be shared among a single customer's working traffic belonging to different service instances. This is possible for large customers who need many services between multiple node pairs across a given network. Also, protection bandwidth may be shared among multiple customers' working traffic since these different customers will be using working bandwidth between various node pairs across a given network so as to allow for higher probability of sharing of protection bandwidth. Note that, protection bandwidth may be dedicated for some customer and, hence, sharing of protection bandwidth in the network may not be across all customers. Protection bandwidth may include timeslots located on different sets of wavelengths compared to working bandwidth. This results in different architectures in the network 100 such as express lightpaths versus non-express lightpaths. Alternatively, protection bandwidth may include an entire wavelength. Still further, protection bandwidth may be partitioned on some logical higher layer construct (such as Ethernet or Internet Protocol (IP) flows, i.e., classification of a flow based on one or more packet headers).

The network 100 and the network elements 102a-102i have various techniques to separate traffic based on various parameters, such as by service type, by customer type, by network endpoints, by service provider, by end customer, and the like. Exemplary service types may include voice traffic, video traffic, Internet data, mobile/wireless/cellular traffic, synchronization traffic, network control traffic, network management traffic, and the like. Exemplary customer types may include retail, enterprise, wholesale, government, and the like. Some exemplary techniques to separate traffic include Virtual Private Networks (VPNs) with such VPNs created in either the data layer (i.e., layer two such as Ethernet, Asynchronous Transfer Mode (ATM), Frame Relay (FR), and the like) or the network layer (i.e., layer three such as in IP). Traffic for these VPNs may be either point-to-point, point-to-multipoint, or multipoint between the network 100, customer, or service endpoints. Such partitions of bandwidth as VPNs are currently in use in various Service Provider Networks.

In addition to layer two and layer three VPNs, layer one or Optical VPNs are beginning to be introduced with the ability to identify wavelengths, SONET/SDH, or OTN timeslots assigned between network element 102a-102i pairs for a given customer. Some providers have also automated the allocation of layer one timeslot bandwidth between a subset of network element 102a-102i pairs belonging to a particular customer instance subject to an overall aggregate bandwidth in units of timeslots across all network element 102a-102i pairs of that customer instance. As those of ordinary skill in the art will appreciate, bandwidth may be available over different transmission media such as microwave or millimeter wave radio, cable, optical fiber, etc. However, these VPNs include protection bandwidth to protect against port or transit node or link failures in the network 100. Such isolation of protection bandwidth to each VPN results in minimizing the extent of sharing across multiple customers. It is possible, of course, to share the protection bandwidth across the connections (or traffic flows) within the VPN instance for that customer.

A customer that has more than one VPN may also be unable to share the protection bandwidth across VPNs. A Service Provider thus needs to design more protection bandwidth in the network 100. A customer with more than one VPN thus needs to purchase protection bandwidth for each VPN in the network 100 since each VPN may have different subsets of endpoints of that same customer.

In an exemplary embodiment, network resources such as connection bandwidth may be virtualized to match the performance requirements of Virtual Machines (VM) instance flows between specific ingress and egress ports across a single network element 102a-102i or across a set of the network elements 102a-102i. Specifically, the network element 102a-102i in the network 100 may be partitioned as Virtual Switches (VS) with association of a subset of ports for forwarding of one or more VM instance flows among that subset of ports. Exemplary Virtual Switches are disclosed in commonly-assigned U.S. patent application Ser. No. 12/646,682, filed Dec. 23, 2009 and entitled "VIRTUAL SWITCHING USING A PROVISIONAL IDENTIFIER TO CONCEAL A USER IDENTIFIER;" U.S. patent application Ser. No. 11/735,642, filed Apr. 16, 2007 and entitled "VARYING PACKET SWITCH BEHAVIOR BASED ON A QUALITY OF VIRTUAL INTERFACES ASSOCIATED WITH A VIRTUAL SWITCH;" and U.S. Pat. No. 7,653,056, issued Jan. 26, 2010 and entitled "VIRTUAL SWITCHING USING A PROVISIONAL IDENTIFIER TO CONCEAL A USER IDENTIFIER; with the contents of each incorporated by reference herein.

Virtualization allows computing resources of server machines to be virtualized into Virtual Machines (VMs), i.e., a sharing of the underlying physical machine resources between different virtual machines, e.g. a fraction of processor and memory into a compute instance. One or more VMs may be combined to scale computing resources, and the sizing of VM instances may be done dynamically or statically. VM instances may combine virtualized computing with virtualized storage resources. Peer VMs may be located in different geographic locations, i.e., data centers in different countries, requiring network connection for communication between them. Network connectivity across a Wide Area Network (WAN) is used to associate peer VMs with one or more VM instance flows. This network connectivity may be Ethernet and or Fiber Channel and or InfiniBand (IB) or others such as Small Computer System Interface (SCSI), Serial Advanced Technology Attachment (SATA), and derivatives including Internet Small Computer System Interface (iSCSI) and Fiber Channel over Ethernet (FCoE).

Figure 2:
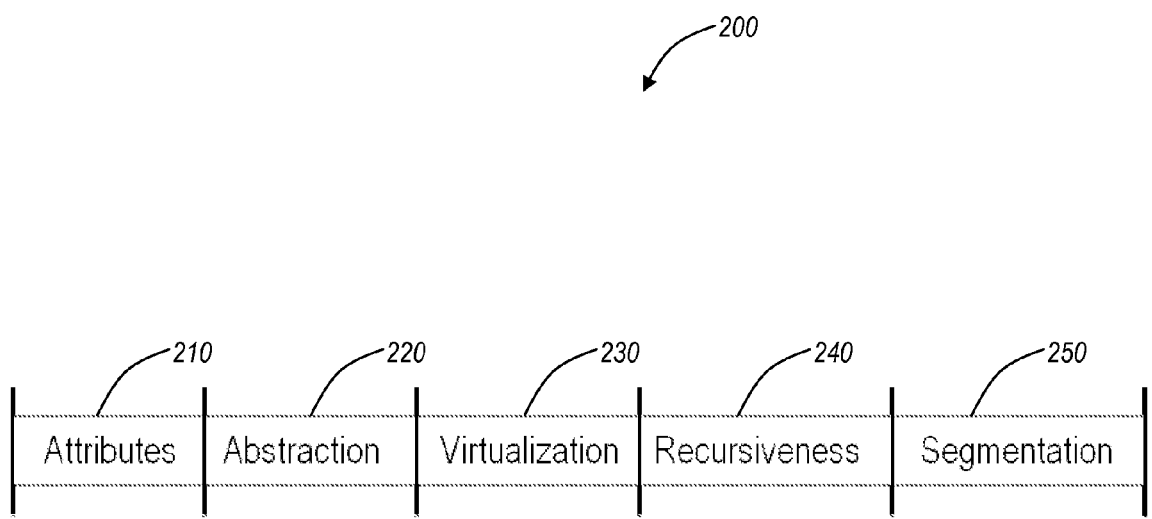
FIG. 2 is a diagram of service attributes with various parameters to qualify Virtual Machine (VM) instance flows over the network of FIG. 1.

Referring to FIG. 2, in an exemplary embodiment, service attributes 200 are illustrated with various parameters to qualify VM instance flows over the network 100. Note, the attributes 200 may be for a specific flow or for an aggregate of flows (e.g. per port, per service type, etc.) where flows are connections in the network 100 between the network elements 102a-102i. The various parameters may include attributes 210, abstraction 220, virtualization 230, recursiveness 240, and segmentation 250. The attributes 210 describe the service such as information transfer rate (including Committed Information Rate (CIR), Excess Information Rate (EIR), etc. and burst sizes (Committed Burst Size (CBS), Excess Burst Size (EBS), etc. The attributes 210 may be used to form a service layer agreement (SLA) such as, for example, with an Ethernet service defined by bandwidth, latency, and media access control (MAC) address. The abstraction 220 provides a definition of the services over the flows. For example, the services may be partially defined such as, for example, an Ethernet service request across optical+Ethernet+IP domains simply specifies Ethernet and lets the network 100 handle the other layers.

The virtualization 230 includes a description of the services for different applications accessing the network. For example, the network 100 may be virtualized into different services for different applications accessing the network 100 such as, for example, a VM administrator may see a first network and a VPN administrator may see a second network, or a MAC address may be virtualized onto a different MAC address. The recursiveness 240 includes a description of how the service is decomposed into sets of services such as, for example, one area is an Ethernet service and one area is over OTN, where the OTN has the same Ethernet service embedded. The segmentation 250 includes a description of how the services may be defined in multiple inclusive or exclusive segments such as, for example, particular VM services should not use a public network, or various protection resources may or may not be shared.

In addition, availability may be a critical attribute to measure downtime on a daily, monthly or yearly basis. Besides the network element 102a-102i reliability, with redundant configuration of ports and/or linecards, it may be required to include path protection (including simultaneously over multiple heterogeneous media) from ingress to egress so as to achieve or improve required availability of the network connectivity.

In an exemplary embodiment, the network 100 and the network elements 102a-102i include a packet transport network that is VM instance aware. Specifically, each of the network elements 102a-102i may include configured policies associated with VM instances that may be as simple as Access Control Lists (ACLs) of ingress/egress ports. This may include default and/or configured Transmission Control Protocol (TCP) ports as well as specific User Datagram Protocol (UDP) ports based on configuration, if any. In each of the network elements 102a-102i, transit ports may be either VM instance aware or blind based on configuration and/or capabilities of the network elements 102a-102i. Note, while ingress/egress port may be packet aware, i.e., Ethernet, a transit port may not be, i.e., OTN. Thus, the present invention includes methods to control resource allocation that take in to account different network elements 102a-102i capabilities in a network domain of an operator.

In the present invention, behavior of the network 100 such as the path, i.e., set of network elements 102a-102i, or the information transfer rate may be dynamically adjusted based on awareness of specific VM instance and/or specific attributes of a VM instance. For example, fault indication via throughput degradation of subset of VM instance flows may warrant restoration of those specific flows. Also, VM instances across the network may be pooled according to shared risk of a given link failure.

Figure 3:
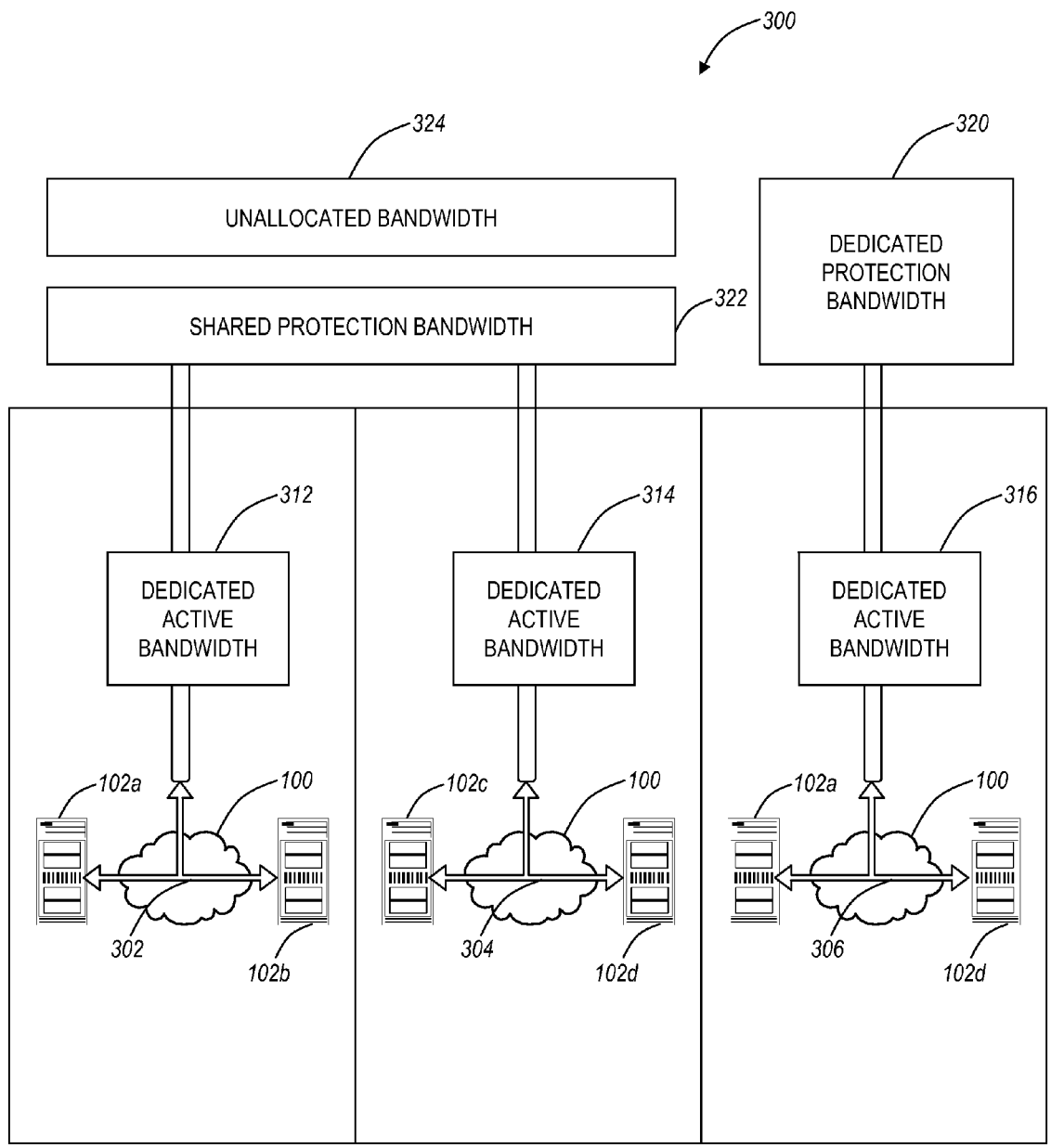
FIG. 3 is a logical diagram of connections in the network of FIG. 1 and associated protection bandwidth including virtualized shared capacity.

Referring to FIG. 3, in an exemplary embodiment, a logical diagram 300 illustrates connections 302, 304, 306 in the network 100. In this example, the network 100 includes a connection 302 between the network elements 102a, 102b, a connection 304 between the network elements 102c, 102d, and a connection between the network elements 102a, 102d. Note, the connections 302, 304, 306 are illustrated from a logical perspective illustrating the ingress/egress points in the network 100 and omitting the intermediate points. Each of the connections 302, 304, 306 has corresponding dedicated active bandwidth 312, 314, 316 on the network 100. Protection bandwidth in the present invention may include either dedicated protection bandwidth 320 or shared protection bandwidth 322. Further, the network 100 may include unallocated bandwidth 324, i.e. bandwidth not in use either as working or protection bandwidth. In this example, the connection 306 has dedicated protection bandwidth 320, and the connections 302, 304 utilize the shared protection bandwidth 322.

The shared protection bandwidth 322 may be referred to as Virtualized Shared Protection Capacity (VSPC) which is identified as a separate resource on the network 100. In the present invention, each VPN or set of one or more VM instance connections may be limited to having only working bandwidth capacity in the layer of interest, i.e., layer one, layer two, or layer three. A separate dedicated Virtual Protection Capacity Layer is defined across the network 100 where units of protection bandwidth is made available between the endpoints of each customer's VPN or set of one or more VM instance connections, i.e. the shared protection bandwidth 322. Further, it is possible to have a mix of dedicated protection bandwidth 320 as well as to have additional resources from the shared Virtual Protection Capacity Layer. Also, it is possible to further allocate the same protection bandwidth, on a given link or a set of links or a path from ingress to egress network element 102a-102i, to multiple VPNs or VM instance connections, i.e., shared protection bandwidth. However, this allocation has to be done subject to any shared risk for ports on a network element 102a-102i or links between the network elements 102a-102i. The various attributes 200 such as latency may be coupled to the connections 302, 304, 306 to provide more sophisticated path selection algorithms including efficient sharing of protection capacity.

Figure 4:
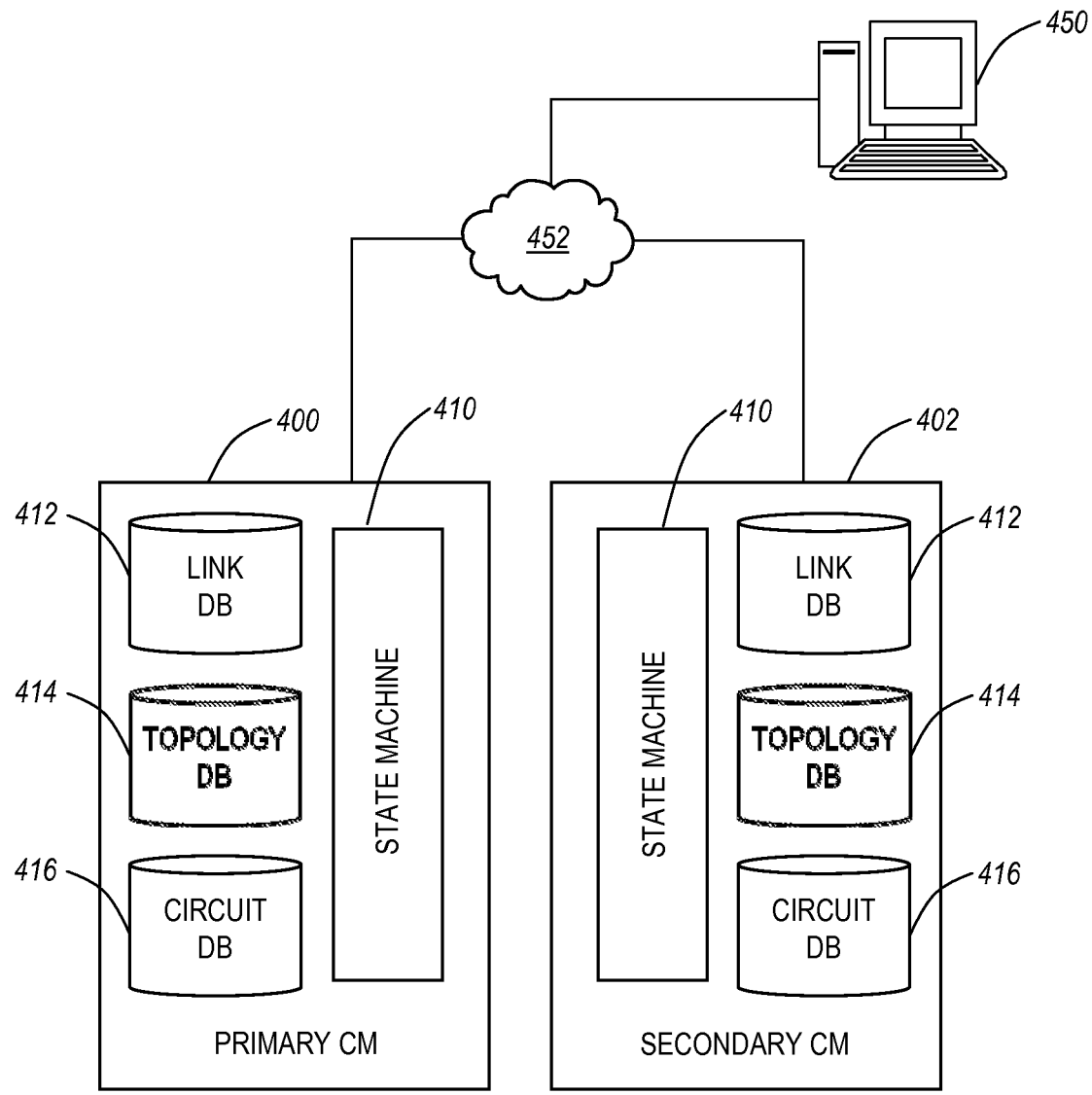
FIG. 4 is a block diagram of redundant control modules (CMs) for the network elements in the network of FIG. 1 to provide control plane processing with virtualized shared capacity.

Use of a shared Virtualized Protection Capacity Layer allows a customer to acquire or augment or release protection resources on an as needed basis, i.e., to temporarily improve the availability of a VPN or a VM instance connections. Protection capacity allocated may be further designed to be hierarchical, i.e., dedicated backup with additional shared mesh restoration bandwidth Referring to FIG. 4, in an exemplary embodiment, redundant control modules (CMs) 400, 202 for the network elements 102a-102i are illustrated to provide control plane processing with virtualized shared capacity. For example, the control plane may include Optical Signaling and Routing Protocol (OSRP), Automatically Switched Optical Networks—ITU-T Recommendation G.8080: Architecture for the Automatically Switched Optical Network (ASON) 2001, Generalized Multi-Protocol Label Switching Architecture (G-MPLS) IETF RFC 3945, 2004, and the like. The CMs 400, 402 may be part of common equipment, such as common equipment 108 in the network elements 102a-102i of FIG. 1. The CMs 400, 402 may include a processor which is hardware device for executing software instructions. The processor may be any custom made or commercially available processor, a central processing unit (CPU), an auxiliary processor among several processors associated with the CMs 400, 402, a semiconductor-based microprocessor (in the form of a microchip or chip set), or generally any device for executing software instructions. When the CM 400, 402 is in operation, the processor is configured to execute software stored within memory, to communicate data to and from the memory, and to generally control operations of the CM 400, 402 pursuant to the software instructions.

The CMs 400, 402 may also include network interfaces, a data store, memory, and the like. The network interfaces may be used to enable the CMs 400, 402 to communicate on a network, such as to communicate control plane information to other CMs. The network interfaces may include, for example, an Ethernet card (e.g., 10BaseT, Fast Ethernet, Gigabit Ethernet) or a wireless local area network (WLAN) card (e.g., 802.11a/b/g). The network interfaces may include address, control, and/or data connections to enable appropriate communications on the network. The data store may be used to store data, such as control plane information received from NEs, other CMs, etc. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store may incorporate electronic, magnetic, optical, and/or other types of storage media. The memory may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory may incorporate electronic, magnetic, optical, and/or other types of storage media. Note that the memory may have a distributed architecture, where various components are situated remotely from one another, but may be accessed by the processor.

Each of the CMs 400, 402 include a state machine 410, a link database (DB) 412, a topology DB 414, and a circuit DB 416. The CMs 400, 402 are responsible for all control plane processing. For example, the control plane may include OSRP, ASON, G-MPLS, or the like. In describing the exemplary embodiments herein, reference is made to OSRP paths, links, legs, and lines. OSRP is a distributed protocol designed for controlling a network of the network elements 102a-102i or cross-connects (OXCs). OSRP introduces intelligence in the control plane of an optical transport system. It can perform many functions such as automatic resource discovery, distributing network resource information, establishing and restoring connections dynamically across the network, and the like. However, the present invention is not limited to OSRP. Those skilled in the art will recognize that other intelligent signaling and routing protocols that can (or can be modified to) provide similar functionality as OSRP (e.g., automatically establishing and restoring connections across the network, and the like) are within the scope of embodiments of the invention. For further background information, some of the routing and signal functions of OSRP are disclosed in commonly owned and co-pending U.S. Pat. No. 7,009,934, Mar. 7, 2006, entitled "METHOD AND APPARATUS FOR REROUTING AN OPTICAL NETWORK UPON FAULT", which is hereby fully incorporated herein by reference, and U.S. Pat. No. 6,859,431, Feb. 22, 2005, entitled "SYSTEM AND METHOD FOR CALCULATING PROTECTION ROUTES IN A NETWORK PRIOR TO FAILURE", which is hereby fully incorporated herein by reference. In an exemplary embodiment, the control plane may be shared across multiple service provider partitions. In this case bandwidth resources are coordinated by means of a centralized call admission control function.

The CMs 400, 402 may be configured in a redundant 1+1, 1:1, etc. configuration. The state machine 410 is configured to implement the behaviors described herein with regard to OTN mesh networking. The DBs 412, 414, 416 may be stored in the memory and/or data store. The link DB 412 includes updated information related to each link in a network. The topology DB 414 includes updated information related to the network topology, and the circuit DB 416 includes a listing of terminating circuits and transiting circuits at a network element where the CMs 400, 402 are located. The CMs 400, 402 may utilize control plane mechanisms to maintain the DBs 412, 414, 416. For example, a HELLO protocol can be used to discover and verify neighboring ports, nodes, protection bundles, and the like. Also, the DBs 412, 414, 416 may share topology state messages to exchange information to maintain identical data. Collectively, the state machine 410 and the DBs 412, 414, 416 may be utilized to advertise topology information, capacity availability, and provide connection management (provisioning and restoration). For example, each link in a network may have various attributes associated with it such as, for example, line protection, available capacity, total capacity, administrative weight, protection bundle identification, delay, and the like. The state machine 410 and the DBs 412, 414, 416 may be configured to provide automated end-to-end provisioning. For example, a route for a connection may be computed from originating node to terminating node and optimized using Dijkstra's Algorithm, i.e. shortest path from source to a destination based on the least administrative cost or weight, subject to a set of user-defined constraints.

Further, the CMs 400, 402 are configured to communicate to other CMs 400, 402 in other nodes on the network. This communication may be either in-band or out-of-band. For SONET networks, the CMs 400, 402 may use standard or extended SONET line overhead for in-band signaling, such as the Data Communications Channels (DCC) (and similarly for SDH networks). Out-of-band signaling may use an overlaid Internet Protocol (IP) network such as, for example, User Datagram Protocol (UDP) over IP. In an exemplary embodiment, the present invention includes an in-band signaling mechanism utilizing OTN overhead. The General Communication Channels (GCC) defined by ITU-T Recommendation G.709 "Interfaces for the optical transport network (OTN)" G.709 are in-band side channel used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. In the present invention, GCC0, GCC1, GCC2 or GCC1+2 may be used for in-band signaling or routing to carry control plane traffic. Based on the intermediate equipment's termination layer, different bytes may be used to carry control plane traffic. If the ODU layer has faults, it has been ensured not to disrupt the GCC1 and GCC2 overhead bytes and thus achieving the proper delivery control plane packets.

In various exemplary embodiments, the present invention of the virtual shared protection capacity layer are managed by the CMs 400, 402. Specifically, virtual shared protection capacity layer can have its own control plane instance as would the dedicated working capacity layers of individual VPNs. In a virtualized environment each virtualized layer such as a VPN may have its own DP/CP/MP (data/control/management planes) entities but with an umbrella management system 450 (connected to the CMs 400, 402 via a data communications network 452) that can coordinate and act as arbiter of resources between the virtualized layers. For example, the management system 450 may include an element management system (EMS), network management system (NMS), operational support system (OSS), or the like. Coordination between the working and the protection capacity layers may be done either with an external centralized Path Computer Element (PCE) at the management system 450 or by dynamic exchange of various service attributes between the CMs 400, 402 associated with each of the network elements 102a-102i. Network resources may also be requested by external network elements such as customer's routers/switches via direct signaling to the respective virtualized layer. Here, for example, the external network elements connect to the network elements 102a-102i, and may use signaling mechanisms such as External Network to Network Interface (E-NNI) or the like.

Mechanisms such as Openflow v1.0.0 (available at www.openflowswitch.org/documents/openflow-spec-v1.0.0.0.pdf) provide for additional external control over a pre-defined 'forwarding' table partition of data switch or crossconnect maps of any switch, and therefore, resources of the network elements 102a-102i, on a per customer or service VPN instance. These may be used in lieu of or in combination with the control plane. State information such as degree of sharing of network resources with other VM instance flows may be communicated with an external VM manager that may be part of the management system 450 or an external device communicatively coupled to the network elements 102a-102i or the CMs 400, 402. There may be additional feedback mechanisms to control this degree of sharing as a function of time or service type.

Figure 5:
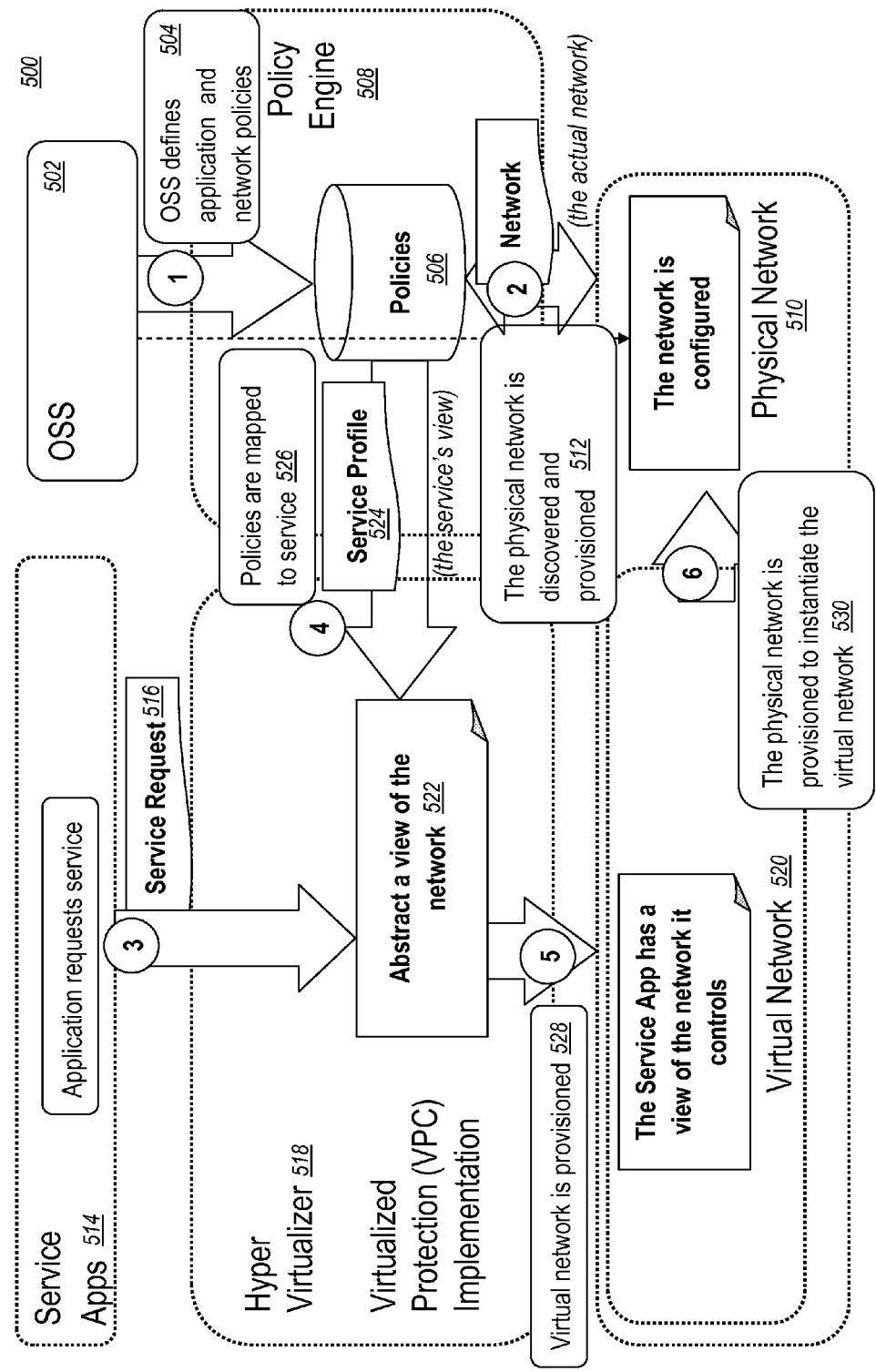
FIG. 5 is a flow diagram of interaction between external and embedded systems in the network of FIG. 1 providing virtualized shared capacity.

Referring to FIG. 5, in an exemplary embodiment, a diagram illustrates interaction 500 between external and embedded systems in the network 100 providing virtualized shared capacity. The interaction 500 is illustrated as a flow chart between software systems, such as the management system 450 and the CMs 400, 402, and the actual network 100 and the network elements 102a-102i. The network 100 may be categorized as both a physical network and a virtual network that includes objects that correspond to the physical network. An OSS 502 is configured to define application and network policies (step 504) and store these in a policies database 506 that is part of a policy engine 508. The policy engine 508 may be part of the OSS 502, the management system 450, the CMs 400, 402, or the like. The policies may include the service attributes 200 and other parameters associated with the virtualized shared capacity. The policy engine 508 is configured to share the policies with a physical network 510 and to discover and provision the physical network (step 512). This may include sending the policies via a management channel from the OSS 502 to network elements, CMs, or the like. Also, this may include utilizing control plane signaling to send requests and the like. A service application 514 is configured to request services from the network (step 516). The service application 514 may be included on one of the network elements 102a-102i, on a client device attached to the network elements 102a-102i, or the like.

A hyper virtualizer 518 is configured to manage and maintain a virtual network 520. The hyper virtualizer 518 may be implemented in the management system 450, the OSS 502, or the like. Alternatively, the hyper virtualizer 518 may be implemented across a plurality of CMs 400, 402 in network elements 102a-102i. The hyper virtualizer 518 is configured to manage and maintain an abstract view 522 of the network. The abstract view 522 is configured to receive a service profile 524 from the policies database 506 wherein policies are mapped to services (step 526). The hyper virtualizer 518 is utilized to implement virtualized protection. Through the hyper virtualizer 518, the virtual network 520 is provisioned (step 528). Here, the service application 514 has a view of the network it controls, i.e. the virtual network 520. That is, the service application 514 has a view of the virtual network 520, but not necessarily of the physical network 510. The physical network 510 is provisioned to instantiate the virtual network 520 (step 530).

The virtualized protection includes a pool of restoration capacity that is shared by a number of independent VPNs or VMs, e.g. the shared protection bandwidth 322 in FIG. 3. In its simplest form, there is a set of working bandwidth using a common pool of restoration capacity, i.e. basic mesh restoration. Here, a carrier can partition the working bandwidth into private domains and still continue to perform shared mesh restoration. This kind of sharing may be of interest as it is likely to apply economies of scale to help reduce costs. In a sense, the control plane provides a set of virtual resources that are managed via the actual physical network 510. The present invention may be viewed as adding another set of virtual resources on top that include a pool of shared protection resources that may be used by individual VPNs, VMs, etc.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A network element, comprising:
   a plurality of ports interfacing to a plurality of other network elements; and
   a control element coupled to the plurality of ports, wherein the control element is configured to provide dedicated active bandwidth, dedicated protection bandwidth, and shared protection bandwidth at layer one, and to provide virtualized shared protection capacity across a plurality of instance flows over the plurality of ports, wherein the virtualized shared protection capacity comprises the shared protection bandwidth at layer one, and wherein the plurality of instance flows comprise one or more of optical virtual private networks and virtual machines using the virtualized shared protection capacity over the plurality of ports, and wherein the virtualized shared protection capacity comprises its own control plane instance operating at layer one separate from the dedicated active bandwidth and the dedicated protection bandwidth thereby enabling partitioning of the dedicated active bandwidth and the dedicated protection bandwidth into private domains while supporting shared mesh restoration.

2. The network element of claim 1, wherein each of the plurality of ports comprises one of an ingress port, an egress port, and a transit port, and wherein the ingress port and the egress port are configured to be instance aware of the virtualized shared protection capacity.

3. The network element of claim 1, wherein the plurality of instance flows comprise one or more of the virtual private networks and the virtual machines.

4. The network element of claim 3, further comprising:
   a signaling and routing protocol operating on the control element and configured to communicate with the plurality of other network elements to manage and maintain the plurality of instance flows; and
   a communication interface in the control element communicatively coupled to a management system;
   wherein the signaling and routing protocol and the management system are configured to discover and allocate resources associated with the plurality of instance flows.

5. The network element of claim 4, further comprising:
   algorithms operating with the signaling and routing protocol and on the management system and the control element for efficient allocation and release of the virtualized shared protection capacity.

6. The network element of claim 4, further comprising:
   a plurality of attributes associated with each of the plurality of instance flows for the virtualized shared protection capacity.

7. The network element of claim 1, wherein at least one of the plurality of ports comprises dedicated protection bandwidth in addition to the virtualized shared protection capacity.

8. The network element of claim 1, wherein the plurality of instance flows comprise one or more of the virtual private networks and the virtual machines;
   wherein a client device attaches to one of the plurality of ports, the client device comprising a service application configured to request service from a hyper virtualizer on the network element;

wherein the hyper virtualizer is configured to manage and maintain an abstract view of a network associated with the network element, the abstract view comprising a virtual network; and wherein the hyper virtualizer is configured to provide virtualized protection over one of the virtual private networks and the virtual machines.

9. The network element of claim 8, wherein the virtualized protection comprises a separate resource allowing each of the virtual private networks and virtual machines to have working capacity only in a layer of interest comprising any of layer zero, layer one, layer two, and layer three.

10. The network element of claim 9, wherein the separate resource comprises units of protection bandwidth made available at endpoints of each of the virtual private networks and virtual machines.

11. A network, comprising:

a plurality of interconnected nodes at layer one, each node comprising a plurality of ports interfacing a plurality of other nodes, and a control element coupled to the plurality of ports, wherein the control element is configured to utilize layer one bandwidth categorized as dedicated active bandwidth, dedicated protection bandwidth, and shared protection bandwidth, wherein virtualized shared protection capacity comprises the shared protection bandwidth; and a signaling and routing protocol operating on the control elements and configured to communicate between the plurality of interconnected nodes to manage and maintain a plurality of instance flows across the plurality of interconnected nodes;

wherein the plurality of instance flows comprise one or more of virtual private networks and virtual machines, and wherein the virtualized shared protection capacity is utilized by the virtual private networks or the virtual machines over the plurality of nodes; and wherein the virtualized shared protection capacity comprises its own control plane instance operating at layer one separate from the dedicated active bandwidth and the dedicated protection bandwidth thereby enabling partitioning of the dedicated active bandwidth and the dedicated protection bandwidth into private domains while supporting shared mesh restoration.

12. The network of claim 11, wherein the virtualized protection comprises a separate resource allowing each of the virtual private networks and virtual machines to have working capacity only in a layer of interest comprising any of layer zero, layer one, layer two, and layer three.

13. The network of claim 12, wherein the separate resource comprises units of protection bandwidth made available at endpoints of each of the virtual private networks and virtual machines.

14. The network of claim 11, wherein each of the plurality of interconnected nodes comprises:

a plurality of ports; and a control element coupled to the plurality of ports, wherein the control element is configured to provide the virtualized shared protection capacity across a plurality of instance flows over the plurality of ports.

15. The network of claim 11, wherein each of the plurality of ports comprises one of an ingress port, an egress port, and a transit port, and wherein the ingress port and the egress port are configured to be instance aware of the virtualized shared protection capacity.

16. The network of claim 11, further comprising:

a management system communicatively coupled to the plurality of interconnected nodes;

wherein the signaling and routing protocol and the management system are configured to discover and allocate resources associated with the plurality of instance flows.

17. The network of claim 16, further comprising:

algorithms operating with the signaling and routing protocol and on the management system for efficient allocation and release of the virtualized shared protection capacity.

18. The network of claim 16, further comprising:

a plurality of attributes associated with each of the plurality of instance flows for the virtualized shared protection capacity.

19. The network of claim 11, wherein a client device attaches to one of the plurality of interconnected nodes, the client device comprising a service application configured to request service from a hyper virtualizer associated with the one of the plurality of interconnected nodes;

wherein the hyper virtualizer is configured to manage and maintain an abstract view of the network element, the abstract view comprising a virtual network; and wherein the hyper virtualizer is configured to provide virtualized protection over one of the virtual private networks and the virtual machines.

20. A method, comprising:

from a management platform, defining application and network policies;

discovering a physical network;

mapping the application and network policies to a hyper virtualizer;

from a service application, requesting service from the hyper virtualizer;

instantiating a virtual network on the physical network based on the request, wherein the physical network comprises a layer one network, and wherein the layer one network comprises bandwidth categorized as dedicated active bandwidth, dedicated protection bandwidth, and shared protection bandwidth; and providing virtualized protection via the virtual network for the service, wherein virtualized protection capacity comprises the shared protection bandwidth at layer one, and wherein the virtualized protection capacity comprises a pool of restoration capacity at layer one that is utilized by a plurality of independent optical virtual private networks or virtual machines over the physical network, and wherein the virtualized protection capacity comprises its own control plane instance operating at layer one separate from the dedicated active bandwidth and the dedicated protection bandwidth thereby enabling partitioning of the dedicated active bandwidth and the dedicated protection bandwidth into private domains while supporting shared mesh restoration.

* * * * *